(12) United States Patent
Hayes et al.

(10) Patent No.: US 7,454,008 B1
(45) Date of Patent: Nov. 18, 2008

(54) SYSTEM FOR CLASSIFYING LISTS OF TELEPHONE NUMBERS

(75) Inventors: James M. Hayes, Bellevue, NE (US); Christopher T. Lunde, Omaha, NE (US); Tony J. Warren, Omaha, NE (US)

(73) Assignee: Prairie Systems, Inc., Nebraska, NE (US)

( * ) Notice: Subject to any disclaimer, the term of this patent is extended or adjusted under 35 U.S.C. 154(b) by 346 days.

(21) Appl. No.: 10/809,736

(22) Filed: Mar. 25, 2004

(51) Int. Cl.
*H04M 3/00* (2006.01)
(52) U.S. Cl. ..................................... 379/352
(58) Field of Classification Search ... 378/88.01–88.04, 378/352; 379/352
See application file for complete search history.

(56) References Cited

U.S. PATENT DOCUMENTS

| | | | | |
|---|---|---|---|---|
| 4,764,949 A | * | 8/1988 | Faith et al. | 379/9 |
| 4,941,168 A | * | 7/1990 | Kelly, Jr. | 379/69 |
| 5,596,679 A | * | 1/1997 | Wang | 704/236 |
| 5,848,131 A | * | 12/1998 | Shaffer et al. | 379/88.2 |
| 6,195,417 B1 | * | 2/2001 | Dans | 379/67.1 |
| 6,823,054 B1 | * | 11/2004 | Suhm et al. | 379/134 |
| 6,850,602 B1 | * | 2/2005 | Chou | 379/80 |
| 6,993,119 B1 | * | 1/2006 | Zhang et al. | 379/88.01 |
| 7,006,487 B1 | * | 2/2006 | Ma et al. | 370/352 |
| 2003/0086541 A1 | * | 5/2003 | Brown et al. | 379/88.01 |
| 2004/0235520 A1 | * | 11/2004 | Cadiz et al. | 455/557 |

* cited by examiner

*Primary Examiner*—Ramnandan Singh
(74) *Attorney, Agent, or Firm*—Holland & Hart LLP

(57) ABSTRACT

A system and method for automatically classifying lists of telephone numbers into one or more predetermined categories is provided. The system initiates calls to each telephone number. A specific request is made of the callee, which confirms the number as being "live-answered." The system uses speech recognition software to compare audible sounds received on the other end of the line to a plurality of spoken messages to classify each telephone number that has been classified as "not live-answered" for future use or exclusion. One embodiment of the system records each telephone call, enabling the process to be performed using a single call to each telephone number.

22 Claims, 4 Drawing Sheets

SYSTEM FOR CLASSIFYING LISTS OF TELEPHONE NUMBERS

BACKGROUND OF THE INVENTION

1. Field of the Invention

The present invention relates to systems for classifying lists of telephone numbers into categories and more particularly to an automated system for classifying lists of telephone numbers based on the different audible sounds received when each telephone number is called.

2. Description of the Prior Art

Over the years, the telephone has become a vital tool for use in sales, conducting surveys, canvassing and political promotion. Different types of outbound calling systems and telephone notification services have been developed to utilize customer registries and other contact lists for these purposes. The most successful systems employ live contact between a caller and a callee. Accordingly, lists of telephone numbers are typically supplied to a database within the system for use by the callers. However, the database of telephone numbers is often times plagued by telephone numbers that are no longer in service, temporarily disconnected, or no longer valid for one of a number of different reasons. As the callers place calls to each of the telephone numbers on the database, those numbers that are not valid or do not fit their intended purpose are discarded from the contact database. Callers either attempt to manually determine the validity of the discarded number or permanently discard them from their database, wasting valuable time and money.

Accordingly, what is needed is an automated system for classifying lists of telephone numbers into a plurality of predetermined categories so that databases of telephone numbers can be easily and accurately updated and efficiently used.

SUMMARY OF THE INVENTION

A system for automatically classifying lists of telephone numbers into a plurality of predetermined categories is provided for use on a computer having access to a public telephone network. The system is generally provided with a processor, a data storage medium, a device for accessing a public telephone network and software that is operative on the system for classifying the telephone numbers into the categories and generating various reports to the user regarding the same, according to the user's needs.

The system is provided with a list of telephone numbers and generally submits the list to an automated call-screening pass, which places a call to each telephone number. In one embodiment of the system, a brief message is played, requesting the callee to hang up the telephone. If the callee complies with the request, the telephone number is considered to be a live number and is classified as "live-answered." All numbers not classified as "live-answered" are resubmitted for a second set of calls. The system places the call to each number and speech recognition software compares the audible sounds received from the other end of the line to several different scripts of known messages and greetings. The spoken messages may include those that identify the number dialed as being disconnected, changed, or one that does not accept unidentified calls. The message may also be related to issues other than those directly concerning the telephone number, such as a message advising that all circuits are currently busy or that an area code has been changed. Other messages may include typical corporate and answering system greetings. Each telephone number is labeled according to its classification and stored to a data file for future reporting.

In another embodiment, the system places only one call to each of the originally submitted telephone numbers. Each call is recorded by the system. As with the previous embodiment, the system plays a brief message that requests the callee to hang up the telephone. If the callee complies with the request, the telephone number is considered to be a live number and is classified as "live-answered." The recordings from each of the numbers not classified as "live-answered" are compared to the scripts of known messages and greetings using the speech recognition software. The results of each number are written to a data file to be compiled into one of several different reports as required by the user.

Accordingly, it is one of the principal objects of the present invention to provide an automated system and method for classifying lists of telephone numbers into one of a plurality of predetermined categories.

A further object of the present invention is to provide an automated system for classifying lists of telephone numbers that uses speech recognition software to compare audible sounds received during calls made to each telephone number to one of a plurality of known messages and greetings.

Still another object of the present invention is to provide a system and method of classifying telephone numbers for use in providing a final database of telephone numbers that are substantially free of telephone numbers that are disconnected, changed, or do not accept unidentified calls.

A further object of the present invention is to provide a system and method of automatically classifying lists of telephone numbers into categories that requires minimal active participation by third party callee's.

Yet another object of the present invention is to provide an automated system for classifying lists of telephone numbers into a number of predetermined categories using a single telephone call to each telephone number on the lists.

Still another object of the present invention is to provide an automated system for classifying lists of telephone numbers into one or more predetermined categories that is simple and relatively inexpensive to implement.

These and other objects will be apparent to those skilled in the art.

DESCRIPTION OF THE PREFERRED EMBODIMENT

Figure 1:
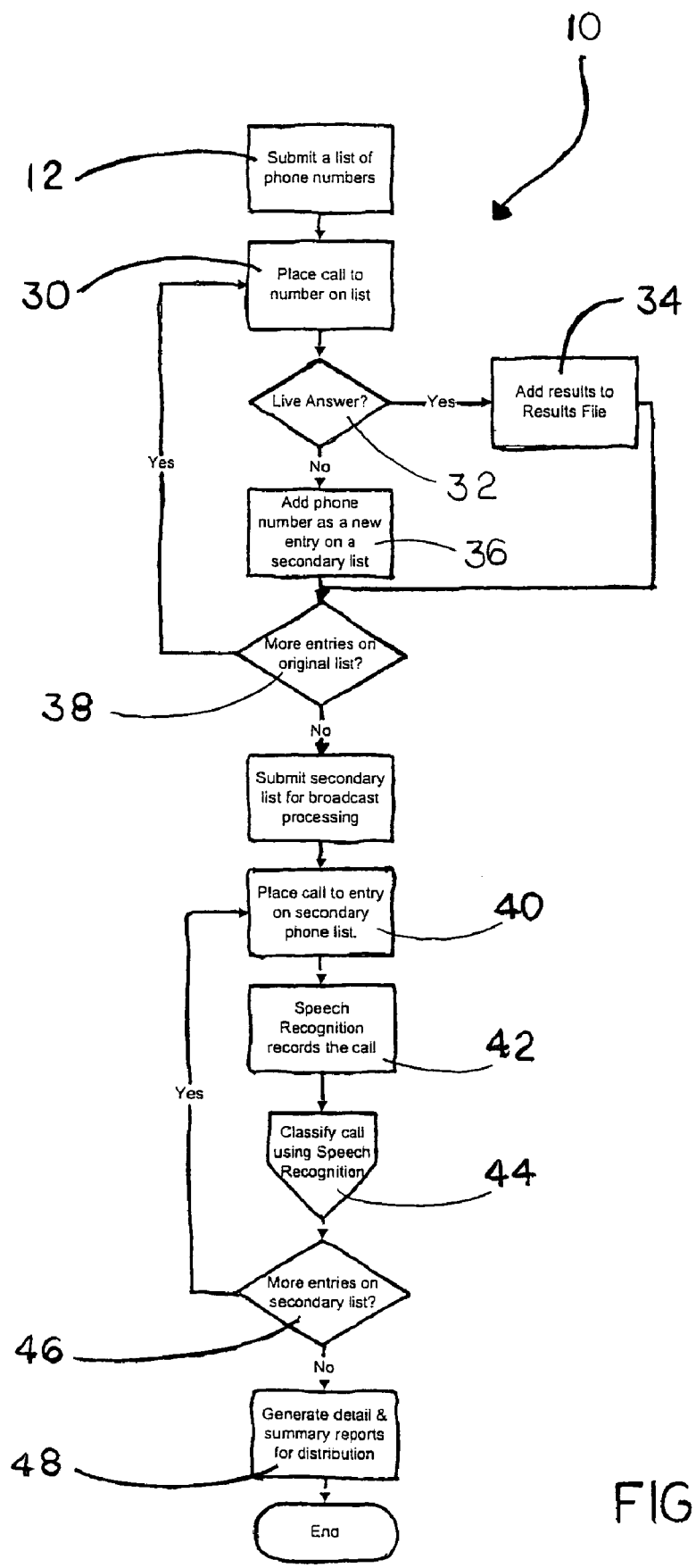
FIG. 1 depicts a flow chart that generally indicates one possible embodiment of the system of the present invention.
Figure 2:
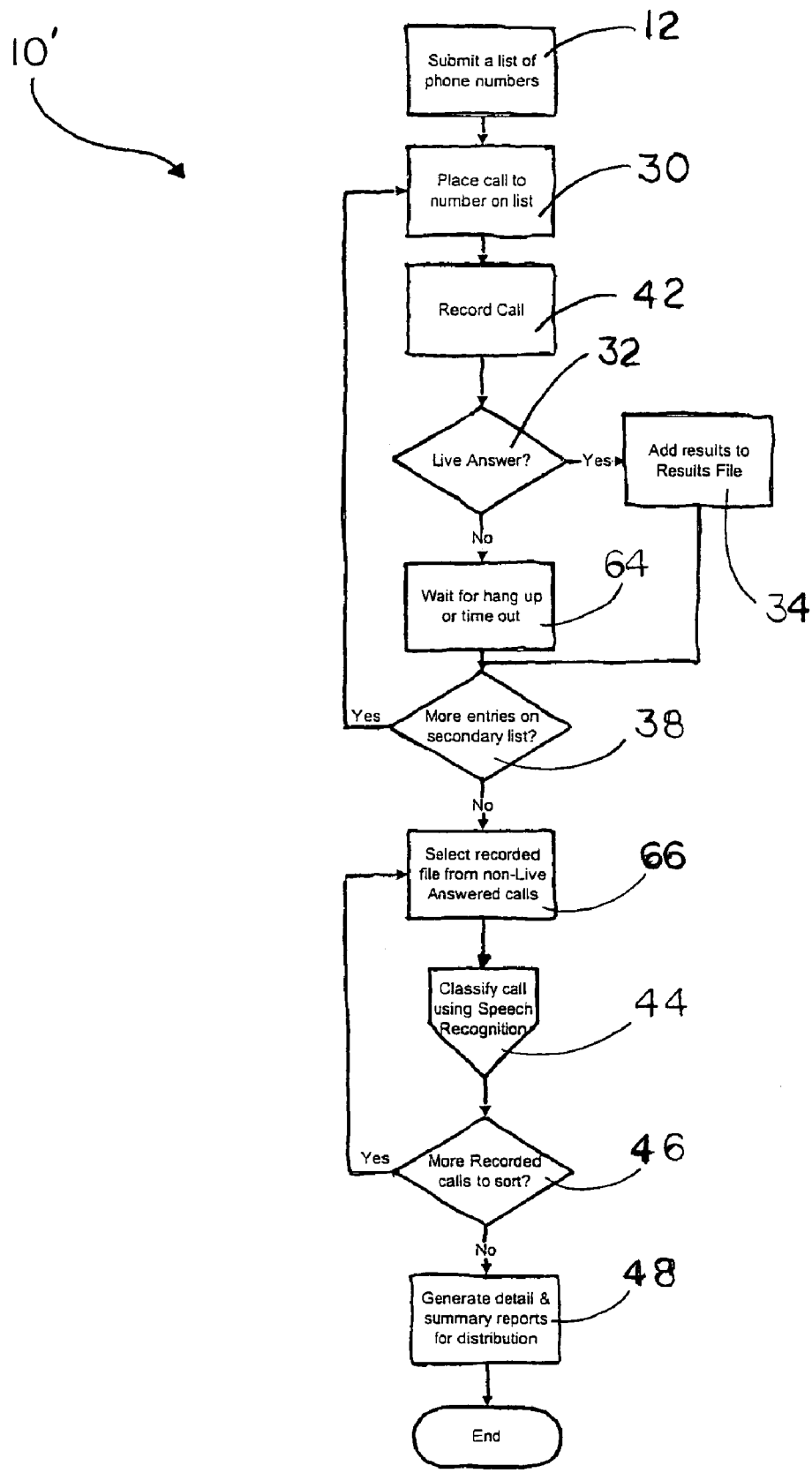
FIG. 2 depicts a flow chart that generally indicates another embodiment of the system of the present invention.
Figure 3:
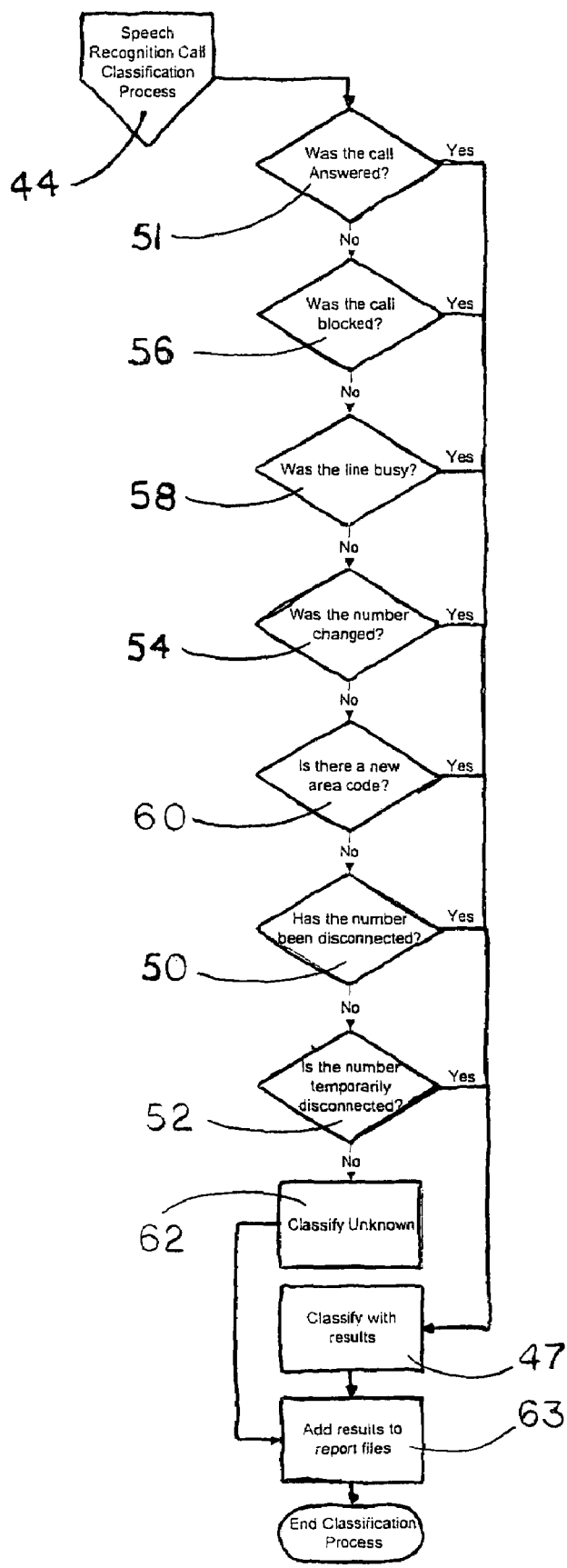
FIG. 3 depicts a flow chart that represents one embodiment of a call classification process, using voice recognition software, which can be used by one or more embodiments of the system of the present invention.
Figure 4:
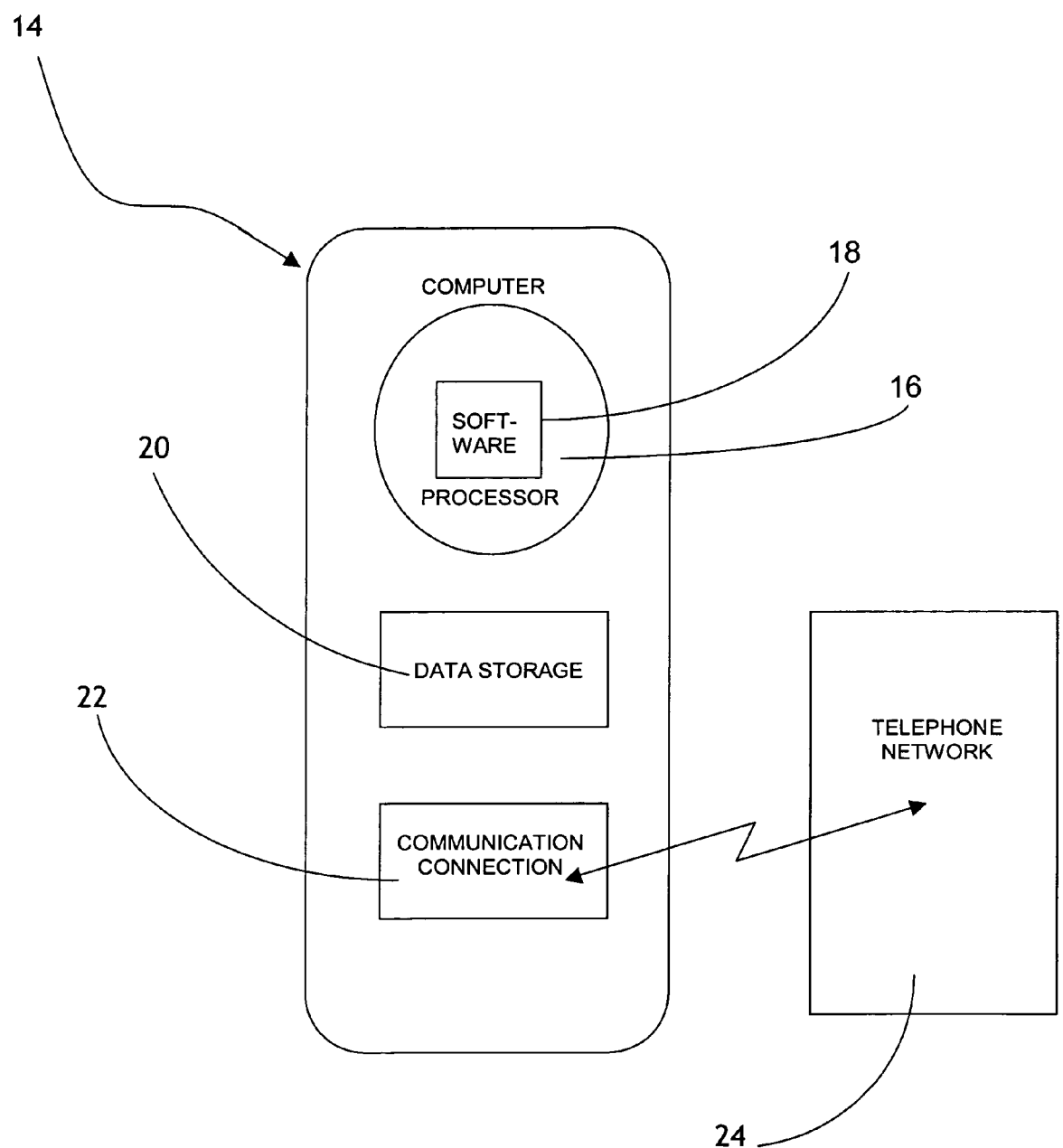
FIG. 4 generally depicts one arrangement of hardware that can be used to implement the system of the present invention.

The telephone number classification system 10 of the present invention is generally provided to automatically process one or more lists of telephone numbers 12 into one or more predetermined categories that qualify each telephone number for future use in databases provided for canvassing, sales, surveys, political uses, advertising, customer registries, or other such endeavors. The hardware components used to implement the system 10 will vary according to the specific intended use and size of the task contemplated. However, the system 10 can generally be operated using a computer 14, having at least a processor 16, on which a variety of software 18 will be operable. A data storage medium 20 will be operatively coupled to the computer 14 and may take one of any known forms, including a hard drive, floppy, zip, CD or other such "diskette" storage medium. The computer 14 will also be provided with a communicating means 22 that is capable of interaction with a public telephone network 24. It is contemplated that the interaction between the communicating means 22 and the public telephone network could be wireless or via landline or the Internet.

One embodiment of the system 10 is generally depicted in FIG. 1. A list of telephone numbers 12 is submitted to the computer 14 and may be permanently or temporarily stored on the storage medium 20. Once the system 10 is initiated, the system 10 performs the step 30 by first placing a call to each number on the list. The software 18 may be programmed to perform step 32 by identifying if and when the telephone line goes off the hook and determine whether or not a live answer is being received. However, it is contemplated that some telephone systems may respond to the call with an automated message or other audible response without taking the line off the hook. In one preferred embodiment the system 10 will pause a few seconds in anticipation of the callee's greeting and then transmit a specific audible request to the callee. One such specific request will ask the callee to simply terminate the call by hanging up the telephone. Other specific requests could include requests to depress one or more specific keys on the keypad of the callee's telephone or to enunciate a specific verbal response. Regardless of the specific nature of the request, an affirmative response from the callee will indicate a live answer and the software 18 will classify the telephone number dialed as being "live-answered." The telephone number and its classification is then preferably saved at least temporarily to the storage medium 20 in a data file during step 34, until the list of telephone calls have been completed.

Where the system 10 does not receive an affirmative response to the specific request made of the callee, the telephone number called will be classified as "not live-answered" and saved at least temporarily as a second data file on the storage medium 20 during step 36. It is contemplated that the software 18 will further provide the system 10 with the ability to detect the return of special information tones, from which the system 10 will classify the telephone number as a number that was "not live-answered." In the present embodiment, the system 10 will terminate the telephone call after the telephone number has been identified as being "live-answered" or "not live-answered."

Once it has been determined that calls have been placed to each of the telephone numbers on the original list 12 at step 38, the system 10 will begin placing telephone calls to each of the numbers saved to the second database that were originally classified as "not live-answered" at step 40. Each call may optionally be recorded during step 42. During each of the second round of telephone calls, the system 10 will utilize speech recognition software within the software 18 to receive and identify audible sounds from the callee during step 44. It will be preferred that the speech recognition portion of the software 18 be provided with a plurality of known audible sounds to compare with those received from the callee. It is contemplated that many of the known audible sounds used by the software 18 will be comprised of at least portions of spoken messages. These messages may include messages advising that the telephone number has been disconnected 50 or temporarily disconnected 52, that the telephone number has been changed 54, or one of several known "privacy blocking" messages 56, including messages indicating that the telephone number does not accept unidentified calls or does not accept solicitations. It is further contemplated that the known audible sounds could include at least portions of spoken messages advising that all circuits on the telephone network 24 are busy 58 or that the area code for the number dialed has changed 60. It is preferred that other common spoken messages be included in the known audible sounds within the software 18, including common corporate and answering system greetings.

It is contemplated that a sub-classification could be created for each such known audible sound identified by the software 18, or a combination of the known audible sounds in accordance with the telephone number testing desired by the user. It is further contemplated that a separate sub-classification such as "unknown" 62 will be necessary for those audible responses received by the system 10 that are not associated with any of the known audible sounds within the software 18. Once each of the telephone numbers have been associated with a sub-classification, the telephone numbers and their sub-classifications will be recorded to a data file during step 47 on the storage medium 20. Once the system determines that no additional calls need to be placed at step 46, the software 18 will use the data file to generate one or more detail and summary reports during step 48 for distribution as the user desires.

In another embodiment, the speech recognition portion of the software 18 is used to analyze the audible sounds received from the callee from a recorded file, rather than requiring a live data stream. Accordingly, the process is similar to the embodiment described hereinabove except that the system 10 records each telephone call that it makes. Each telephone number is classified as "live-answered" or "not live-answered" and then the telephone call is terminated by the system 10. However, the recordings of those telephone calls that are previously classified as "not live-answered" are at least temporarily stored to the storage medium 20. Those recordings are then compared with the known audible sounds within the software 18 in order to provide a sub-category for each "not live-answered" telephone number. It is contemplated that the same sub-categories used in the previous embodiment will be used in the present embodiment. However, other sub-categories can be easily defined and provided to the system 10 depending on the particular needs of the user. Again, each of the sub-classifications and their telephone numbers are written to a data file for the compilation and distribution of summary and detail reports.

In the drawings and in the specification, there have been set forth preferred embodiments of the invention and although specific items are employed, these are used in a generic and descriptive sense only and not for purposes of limitation. Changes in the form and proportion of parts, as well as a substitution of equivalents, are contemplated as circumstances may suggest or render expedient without departing from the spirit or scope of the invention as further defined in the following claims.

Thus it can be seen that the invention accomplishes at least all of its stated objectives.

We claim:

1. A system for automatically classifying a list of telephone numbers into one or more categories, the system comprising:
    a processor;
    a data storage medium for at least temporarily storing the list of telephone numbers;
    means for accessing a telephone network; and
    at least one computer readable medium operatively coupled with said processor and said data storage medium; said at least one computer readable medium comprising:

a) software configured to initiate a first series of calls to telephone numbers from the list of telephone numbers on a line within said telephone network;
b) software configured to play an audible message over said line that requests that a callee on said line terminate said call;
c) software configured to identify whether or not said call has been terminated after said audible message is played; and
d) software configured to classify a telephone number as having been live-answered if said call was terminated, in response to said audible message or classify a telephone number as not live-answered if said call was not terminated in response to said audible message.

2. The system of claim 1 further comprising software configured to create a data file comprising said telephone numbers and the identity of each of said telephone numbers as having been live-answered or not live-answered.

3. The system of claim 2 further comprising software configured to generate reports based on said data file.

4. The system of claim 2 further comprising software configured to initiate a second series of calls to said not live-answered telephone numbers on a line within said telephone network and receive audible sounds on said line.

5. The system of claim 4 further comprising software configured to receive and identify audible sounds on said line and compare said audible sounds to one or more known audible sounds to sub-classify said not live-answered telephone numbers.

6. The system of claim 5 wherein said known audible sounds are comprised of at least portions of spoken messages.

7. The system of claim 6 wherein said spoken messages are comprised of separate messages advising that a telephone number is disconnected, has been changed, or is privacy blocked.

8. The system of claim 6 wherein said spoken messages are comprised of separate messages advising that all circuits are busy or that an area code has changed.

9. The system of claim 6 wherein said spoken messages are comprised of common corporate and answering system greetings.

10. The system of claim 5 further comprising software configured to identify and classify a telephone number from which audible sounds are received that are not similar to said one or more known audible sounds.

11. The system of claim 5 further comprising software configured to create a data file comprising said not live-answered telephone numbers and a sub-classification for each of said not live-answered telephone numbers based on said one or more known audible sounds.

12. The system of claim 11 further comprising software configured to generate reports based on said data file.

13. The system of claim 1 further comprising software configured to identify special information tones on said line after initiating said calls.

14. The system of claim 13 further comprising software configured to classify said telephone numbers as not live-answered when said special information tones are identified.

15. The system of claim 1 further comprising software configured to at least temporarily store said audible sounds received over said line on said data storage medium prior to identifying said audible sounds.

16. The system of claim 15 further comprising software configured to complete said call after receiving and storing said audible sounds but prior to identifying said audible sounds.

17. The system of claim 16 further comprising software configured to classify said telephone numbers as live-answered if said call recipient provides said specific response.

18. The system of claim 16 further comprising software configured to classify said telephone numbers as not live-answered if said callee does not provide said specific response.

19. The system of claim 18 further comprising software configured to compare said audible sounds to one or more known audible sounds to sub-classify said not live-answered telephone number.

20. The system of claim 19 wherein said known audible sounds are comprised of at least portions of spoken messages.

21. The system of claim 15 further comprising software configured to identify special information tones on said line after initiating said calls.

22. The system of claim 21 further comprising software configured to classify said telephone numbers as not live-answered when said special information tones are identified.

* * * * *